United States Patent
Jho et al.

(10) Patent No.: US 12,095,908 B2
(45) Date of Patent: Sep. 17, 2024

(54) KEY GENERATION APPARATUS AND METHOD BASED ON MACHINE LEARNING

(71) Applicant: ELECTRONICS AND TELECOMMUNICATIONS RESEARCH INSTITUTE, Daejeon (KR)

(72) Inventors: Nam-Su Jho, Daejeon (KR); Ju-Young Kim, Daejeon (KR); Ku-Young Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 17/518,905

(22) Filed: Nov. 4, 2021

(65) Prior Publication Data

US 2022/0294620 A1 Sep. 15, 2022

(30) Foreign Application Priority Data

Mar. 11, 2021 (KR) .................. 10-2021-0032053

(51) Int. Cl.
*H04L 9/08* (2006.01)
*G06F 18/214* (2023.01)
*G06N 3/04* (2023.01)
*H04L 9/06* (2006.01)

(52) U.S. Cl.
CPC .......... *H04L 9/0861* (2013.01); *G06F 18/214* (2023.01); *G06N 3/04* (2013.01);
(Continued)

(58) Field of Classification Search
None
See application file for complete search history.

(56) References Cited

U.S. PATENT DOCUMENTS 8,380,992 B2   2/2013   Park et al.
9,648,026 B2   5/2017   Pelletier
(Continued)

FOREIGN PATENT DOCUMENTS

KR   10-2010-0050846 A   5/2010
KR   10-1075316 B1   10/2011
(Continued)

OTHER PUBLICATIONS

I. Dong et. al. "Neural Cryptography Based on Complex-Valued Neural Network", IEEE Transactions on Neural Networks and Learning Systems, vol. 31, No. 11, Nov. 2020 (Year: 2020).*

(Continued)

*Primary Examiner* — Bassam A Noaman
(74) *Attorney, Agent, or Firm* — NSIP Law (57) ABSTRACT

Disclosed herein are a key generation apparatus and method based on machine learning. The key generation method includes generating, by first and second key generation apparatuses, first and second commit values, and uploading the first commit value and the second commit value to an external repository, training, by the first and second key generation apparatuses, a neural network so as to match weight values with each other, sharing, by the first and second key generation apparatuses, the first and second commit values with each other, comparing shared first and second commit values with uploaded commit values, and then verifying the commit values, and when verification of the commit values has succeeded, generating, by the first and second key generation apparatuses, hash values using the matched weight value, verifying whether the hash values are identical to each other, and generating a session secret key based on a result of verification.

14 Claims, 3 Drawing Sheets

(52) U.S. Cl.
CPC .......... *H04L 9/0643* (2013.01); *H04L 9/0825* (2013.01); *H04L 9/085* (2013.01)

(56) References Cited

U.S. PATENT DOCUMENTS

| | | | |
|---|---|---|---|
| 9,721,190 B2 | 8/2017 | Vijayanarasimhan et al. | |
| 2015/0149777 A1 | 5/2015 | Kim et al. | |
| 2017/0339118 A1 | 11/2017 | Hwang et al. | |
| 2020/0242170 A1* | 7/2020 | Pogrebezky | G06F 16/986 |
| 2020/0304292 A1* | 9/2020 | Mochalov | H04L 9/3239 |
| 2021/0110048 A1* | 4/2021 | Guo | G06F 21/602 |
| 2022/0158825 A1* | 5/2022 | Sandell | H04L 9/0861 |

FOREIGN PATENT DOCUMENTS

| | | |
|---|---|---|
| KR | 10-1363290 B1 | 2/2014 |
| KR | 10-2015-0142623 A | 12/2015 |
| KR | 10-2070248 B1 | 1/2020 |
| KR | 10-2164904 B1 | 10/2020 |
| KR | 10-2186764 B1 | 12/2020 |

OTHER PUBLICATIONS

Hayfaa et. al. "Machine Learning Based Key Generating for Cryptography", Journal of Engineering and Applied Sciences 11 (8): 1829-1834, 2016 ISSN: 1816-949X Medwell Journals, 2016 (Year: 2016).*

Kanter, Ido et al., "Secure Exchange of Information by Synchronization of Neural Networks." *EPL* (*Europhysics Letters*), 57, 1, Feb. 7, 2002 (pp. 1-11).

Lei, Xinyu, et al., "Two-layer tree-connected feed-forward neural network model for neural cryptography." *Physical Review* E 87.3, 2013 (pp. 1-13).

* cited by examiner

KEY GENERATION APPARATUS AND METHOD BASED ON MACHINE LEARNING

CROSS REFERENCE TO RELATED APPLICATION

This application claims the benefit of Korean Patent Application No. 10-2021-0032053, filed Mar. 11, 2021, which is hereby incorporated by reference in its entirety into this application.

BACKGROUND OF THE INVENTION

1. Field

The present invention relates generally to neural-network cryptography technology, and more particularly to key generation, key exchange, and user authentication technology based on artificial-intelligence machine learning.

2. Description of Related Art

In an open communication environment, sharing a trusted secret key between two users or between a server and a user is very important technology for ensuring the security of an information protection service.

Currently, as technology for sharing a secret key between users, key exchange technology based on the principle of public key cryptography is chiefly utilized, but there is the concern that security-related problems will become easy to solve in current public key cryptography technology, the security of which is based on algebraic problems, due to the development of future computing technology such as quantum computers, whereby security will be seriously compromised.

Neural network cryptography technology is a field which investigates the design of a cryptography algorithm including key exchange using a neural network learning model which imitates the intelligence of a human being, instead of designing a cryptography algorithm using an existing specific security-based problem. Such neural network cryptography technology is regarded as a new attempt to overcome fundamental limitations of an existing cryptography algorithm completely depending on security in the specific security-based problem.

In particular, a lot of research into neural network synchronization-based key exchange technology, among neural-network cryptography technologies, has been conducted, wherein the neural network synchronization-based key exchange technology allows two users to exchange keys with each other using a process in which two neural networks initialized to arbitrary values are synchronized with each other through learning based on a small amount of information shared in an open communication environment. Accordingly, efficiency of cryptography technology that is available in an actual environment is shown.

The provision of a method of allowing a user to identify another party with whom a key is shared is considered the most important requirement, together with the efficiency of a key exchange process in key exchange technology, and technology for enabling the user to accurately identify the other party in a key exchange process is referred to as "authenticated key exchange".

In the case of unauthenticated key exchange technology, an attacker that controls a communication environment through a man-in-the-middle attack functions to exchange respective keys with two users and transfer all communication details of the users from a position in the middle of a communication path, thus acquiring all communication details made by the users regardless of security of key exchange technology.

Meanwhile, Korean Patent Application Publication No. 10-2015-0142623 entitled "Cryptographic Method for Securely Exchanging Messages and Device and System for Implementing this method" discloses a method which allows at least two devices D1 and D2 storing a shared secret key K common thereto to securely exchange a message M with each other.

SUMMARY OF THE INVENTION

Accordingly, the present invention has been made keeping in mind the above problems occurring in the prior art, and an object of the present invention is to provide key exchange technology and user authentication for overcoming vulnerability to a man-in-the-middle attack at the time of key exchange between users and for implementing secure secret communication.

In accordance with an aspect of the present invention to accomplish the above object, there is provided a key generation method based on machine learning, the key generation method being performed by key generation apparatuses based on machine learning, the key generation method including generating, by a first key generation apparatus, a first commit value, generating, by a second key generation apparatus, a second commit value, and uploading the first commit value and the second commit value to an external repository; training, by the first key generation apparatus and the second key generation apparatus, a neural network so as to match weight values thereof with each other using a predefined neural-network learning algorithm; sharing, by the first key generation apparatus and the second key generation apparatus, the first commit value and the second commit value with each other, comparing the shared first and second commit values with the first and second commit values uploaded to the external repository, and then verifying the commit values; and when verification of the commit values has succeeded, generating, by the first key generation apparatus and the second key generation apparatus, respective hash values using the matched weight value, verifying whether the generated hash values are identical to each other, and generating a session secret key based on a result of verification of the hash values.

Verifying the commit values may be configured such that the first key generation apparatus and the second key generation apparatus use a Message Authentication Code (MAC) to generate respective MAC values from parity bits which are output during training of the neural network, and secret values which are used for generation of the commit values.

Verifying the commit values may be configured such that the first key generation apparatus and the second key generation apparatus share the generated MAC values with each other, compare the shared MAC values with verification MAC values generated thereby, and then verify the MAC values.

Generating the session secret key may be configured to generate seed values from the weight values using a predefined one-way function.

Generating the session secret key may be configured to generate the hash values from the seed values and previously shared key generation information using a predefined hash function.

Generating the session secret key may be configured such that the first key generation apparatus and the second key generation apparatus share the generated hash values with each other, compare the shared hash values with the hash values generated thereby, and then verify whether the shared hash values match the generated hash values.

Generating the session secret key may be configured to, when the hash values match each other, determine that verification of the hash values has succeeded, and generate the session secret key from the hash values and the key generation information using a predefined key generation function.

In accordance with another aspect of the present invention to accomplish the above object, there is provided a key generation apparatus based on machine learning, including one or more processors; and an execution memory for storing at least one program that is executed by the one or more processors, wherein the at least one program is configured to generate a commit value and upload the commit value to an external repository, train a neural network so as to match a weight value of the key generation apparatus with a weight value of an additional key generation apparatus with which user authentication is performed, using a predefined neural-network learning algorithm, share the commit value and a commit value of the additional key generation apparatus with the additional key generation apparatus, compare the shared commit values with respective commit values uploaded to the external repository, and then verify the commit values, and when verification of the commit values has succeeded, generating a hash value using the matched weight value, verify whether the generated hash value and a hash value generated by the additional key generation apparatus are identical to each other, and generate a session secret key based on a result of verification of the hash values.

The at least one program may be configured to use a Message Authentication Code (MAC) to generate a MAC value from a parity bit which is output during training of the neural network and a secret value which is used for generation of the commit value.

The at least one program may be configured to share the generated MAC value and a MAC value generated by the additional key generation apparatus with the additional key generation apparatus, compare the shared MAC value with a verification MAC value generated by the key generation apparatus, and then verify the MAC value.

The at least one program may be configured to generate a seed value from the weight value using a predefined one-way function.

The at least one program may be configured to generate the hash value from the seed value and previously shared key generation information using a predefined hash function.

The at least one program may be configured to share the generated hash value and a hash value generated by the additional key generation apparatus with the additional key generation apparatus, compare the shared hash value with the hash value generated by the key generation apparatus, and verify whether the hash values match each other.

The at least one program may be configured to, when the hash values match each other, determine that verification of the hash values has succeeded, and generate the session secret key from the hash values and the key generation information using a predefined key generation function.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 1:
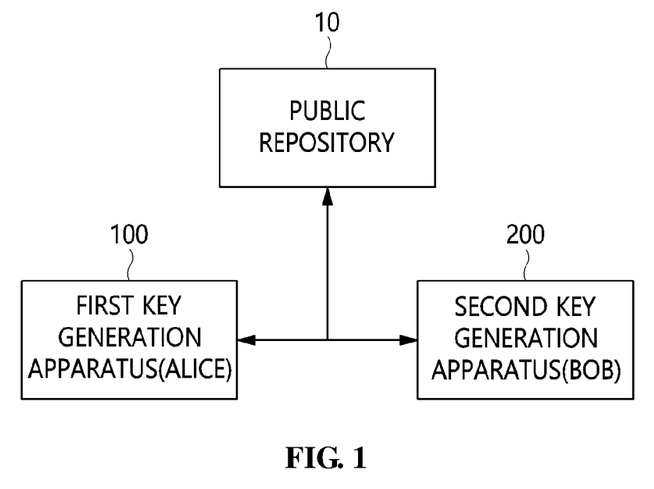
FIG. 1 is a block diagram illustrating a key generation system based on machine learning according to an embodiment of the present invention.
Figure 2:
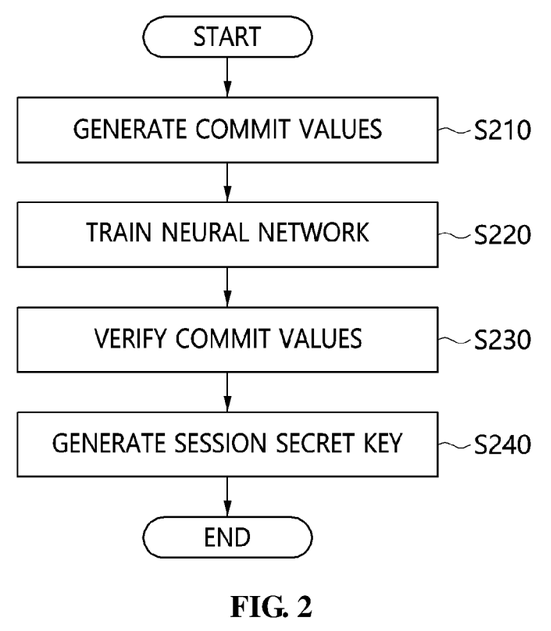
FIG. 2 is an operation flowchart illustrating a key generation method based on machine learning according to an embodiment of the present invention.

FIG. 1 is a block diagram illustrating a key generation system based on machine learning according to an embodiment of the present invention. FIG. 2 is an operation flowchart illustrating a key generation method based on machine learning according to an embodiment of the present invention.

The key generation system based on machine learning according to the embodiment of the present invention includes a public repository 10, a first key generation apparatus 100, and a second key generation apparatus 200.

The first key generation apparatus 100 and the second key generation apparatus 200 may be represented by "Alice" and "Bob" as designated in the cryptography technology field.

Referring to FIG. 2, the key generation method based on machine learning according to the embodiment of the present invention may first generate commit values at step S210.

That is, at step S210, the first key generation apparatus 100 and the second key generation apparatus 200 generate multiple commit values for key generation and key exchange, and may upload the commit values to the public repository 10, which is an external repository (external storage).

Here, at step S210, the public repository 10 opens the uploaded commit values, and may share the uploaded commit values with the first key generation apparatus 100 and the second key generation apparatus 200.

In detail, at step S210, each of the first key generation apparatus 100 and the second key generation apparatus 200 may generate a commit value using a previously generated secret value and a random number.

At step S210, the first key generation apparatus 100 may generate a first commit value $c_A$=commit ($sk_A$, $r_A$) using both a first secret value $sk_A$ and a first random number $r_A$.

At step S210, the second key generation apparatus 200 may generate a second commit value $c_B$=commit ($sk_B$, $r_B$) using both a second secret value $sk_B$ and a second random number $r_B$.

In detail, at step S210, each of the first key generation apparatus 100 and the second key generation apparatus 200 may generate the corresponding commit value using a keyed hash function as a commit algorithm.

The secret values and the random numbers may be open for subsequent verification.

Next, in the key generation method based on machine learning according to the embodiment of the present invention, the first key generation apparatus 100 and the second key generation apparatus 200 may train a neural network so that respective weight values thereof match each other using a predefined neural-network learning algorithm at step S220.

Here, the first weight value of the first key generation apparatus 100 may be represented by "$weight_A$", and the second weight value of the second key generation apparatus 200 may be represented by "$weight_B$".

At step S220, the first key generation apparatus 100 and the second key generation apparatus 200 may match the first weight value with the second weight value using the predefined neural-network learning algorithm.

Here, any of various conventional neural network algorithms may be used as the neural-network learning algorithm.

Further, in the key generation method based on machine learning according to the embodiment of the present invention, the first key generation apparatus 100 and the second key generation apparatus 200 may share the first commit value and the second commit value with each other so as to perform mutual authentication, and may verify the commit values by comparing the first commit value and the second commit value with the first commit value and the second commit value uploaded to the public repository 10 at step S230.

At step S230, the first key generation apparatus 100 and the second key generation apparatus 200 may use a Message Authentication Code (MAC) to generate MAC values from a set of output values (parity bits) generated during training of the neural network, and the secret values used to generate the commit values.

In this case, at step S230, the first key generation apparatus 100 may generate a first MAC value $m_A$=mac($sk_A$, $p_A$) using both a set $p_A$ of output values (first parity bits) generated during training of the neural network and the first secret value $sk_A$ used to generate the first commit value.

Further, at step S230, the second key generation apparatus 200 may generate a second MAC value $m_B$=mac($sk_B$, $p_B$) using both a set $p_B$ of output values (second parity bits) generated during training of the neural network and the second secret value $sk_B$ used to generate the second commit value.

Here, at step S230, the first key generation apparatus 100 may transmit the first MAC value to the second key generation apparatus 200, and the second key generation apparatus 200 may transmit the second MAC value to the first key generation apparatus 100.

At step S230, the first key generation apparatus 100 may transmit the first commit value, the first secret value, and the first random number to the second key generation apparatus 200.

At step S230, the second key generation apparatus 200 may check whether the received first commit value matches the first commit value uploaded to the public repository 10, and may generate a first verification MAC value $m_{AB}$=mac ($sk_A$, $p_B$) using the received first secret value $sk_A$.

At step S230, the second key generation apparatus 200 may compare the received first MAC value with the first verification MAC value, may determine that verification has succeeded when the MAC values match each other, and may transmit the second commit value, the second secret value, and the second random number to the first key generation apparatus 100.

At step S230, the first key generation apparatus 100 may check whether the received second commit value matches the second commit value uploaded to the public repository 10, and may generate a second verification MAC value $m_{BA}$=mac ($sk_B$, $p_A$) using the received second secret value $sk_B$.

Here, at step S230, the first key generation apparatus 100 may compare the received second MAC value with the second verification MAC value, and may determine that verification has succeeded when the MAC values match each other.

Furthermore, in the key generation method based on machine learning according to the embodiment of the present invention, the first key generation apparatus 100 and the second key generation apparatus 200 may generate a first hash value and a second hash value, respectively, using the matched weight value, and may generate a session secret key based on the result of mutually verifying whether the first hash value is identical to the second hash value at step S240.

In this case, at step S240, the first key generation apparatus 100 may generate a first seed value $seed_A$=OWF ($weight_A$) from the first weight value $weight_A$ using a predefined one-way function.

Here, one of various conventional hash functions may be used as the one-way function.

Here, at step S240, the first key generation apparatus 100 may generate a first hash value $ck_A$=H($seed_A$||$info_A$) from the first seed value $seed_A$ using a predefined hash function, and may transmit the first hash value $ck_A$ to the second key generation apparatus 200.

Because the first key generation apparatus 100 and the second key generation apparatus 200 match their weight values with each other during training of the neural network, $weight_A$=$weight_B$ may be satisfied.

Therefore, the second key generation apparatus 200 may generate a second seed value $seed_B$=OWF($weight_B$) from the second weight value $weight_B$ using the predefined one-way function.

At step S240, the second key generation apparatus 200 may generate a second hash value $ck_B$=H($seed_B$||$info_B$) from the first seed value $seed_B$ using a predefined hash function, and may verify whether the first hash value matches the second hash value.

Here, $info_A$ and $info_B$ may be key generation information previously shared between the first key generation apparatus 100 and the second key generation apparatus 200 so as to generate hash values.

Here, at step S240, when the first hash value matches the second hash value, the second key generation apparatus 200 may determine that verification of the hash values has succeeded, and may transmit the second hash value $ck_B$ to the first key generation apparatus 100.

At step S240, the first key generation apparatus 100 may verify whether the received second hash value matches the previously generated first hash value, and may determine that verification of the hash values has succeeded when the first hash value matches the second hash value.

Here, at step S240, when verification of the first hash value and the second hash value has been completed, each of the first key generation apparatus 100 and the second key generation apparatus 200 may generate a session secret key $sk=KGF(seed_A, info_{session})=KGF(seed_B, info_{session})$ for secret communication using a predefined Key Generation Function (KGF).

Here, $info_{session}$ may correspond to $info_A$ and $info_B$.

Because the first seed value $seed_A$ and the second seed value $seed_B$ are generated based on the same weight value ($weight_A=weight_B$), the first key generation apparatus 100 and the second key generation apparatus 200 may share the identically authenticated secret session key sk with each other.

Figure 3:
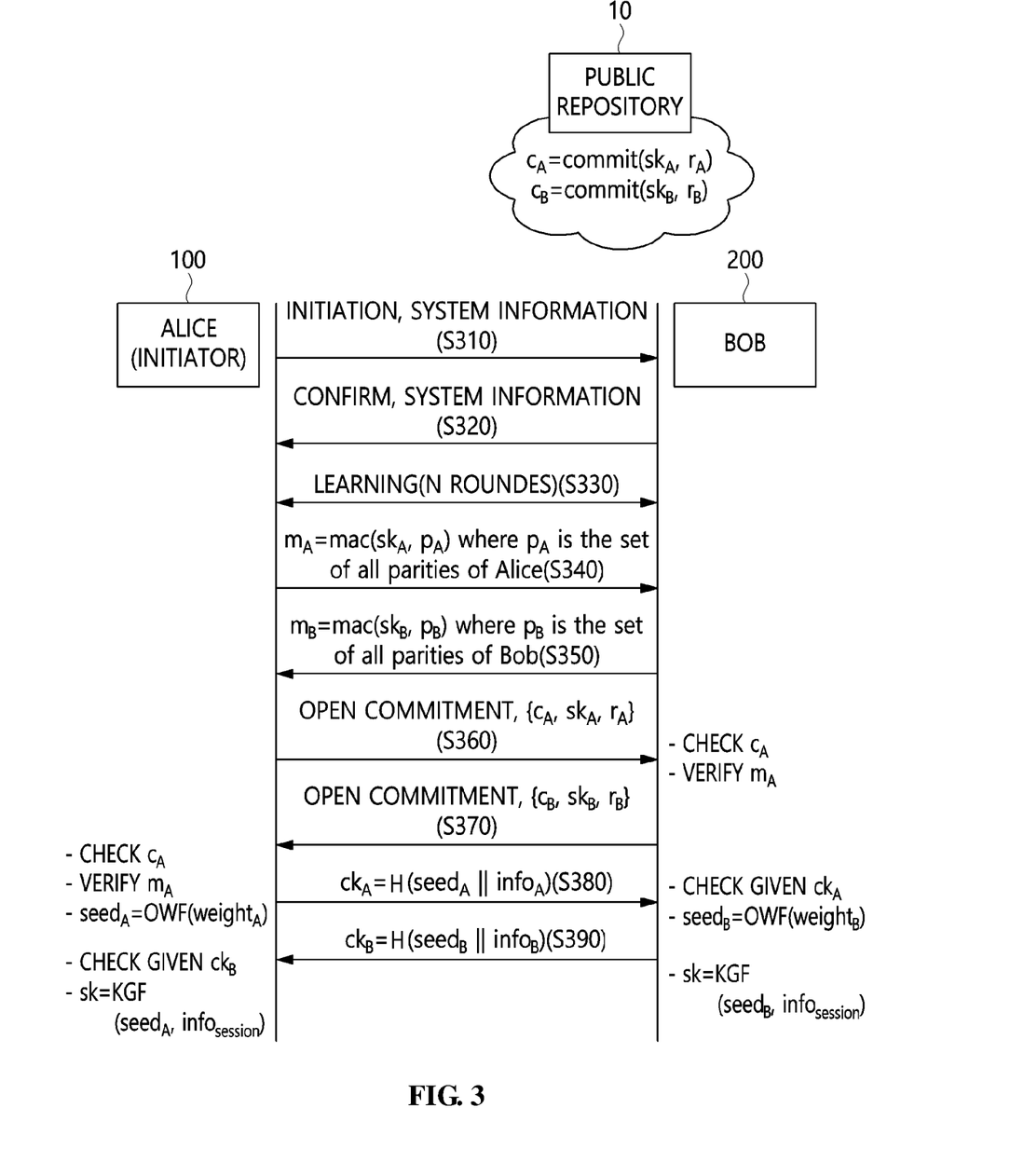
FIG. 3 is a sequence diagram illustrating a key generation method based on machine learning according to an embodiment of the present invention.

FIG. 3 is a sequence diagram illustrating a key generation method based on machine learning according to an embodiment of the present invention.

Referring to FIG. 3, the first key generation apparatus 100 and the second key generation apparatus 200 may generate multiple commit values for key generation and key exchange, and may upload the commit values to the public repository 10, which is an external repository (i.e., external storage), at steps S310 and S320.

Here, at steps S310 and S320, the public repository 10 opens the uploaded commit values, and may share the uploaded commit values with the first key generation apparatus 100 and the second key generation apparatus 200.

In detail, at steps S310 and S320, each of the first key generation apparatus 100 and the second key generation apparatus 200 may generate a commit value using a secret value and a random number.

At steps S310 and S320, the first key generation apparatus 100 may generate a first commit value $c_A=commit(sk_A, r_A)$ using both a first secret value $sk_A$ and a first random number $r_A$.

At steps S310 and S320, the second key generation apparatus 200 may generate a second commit value $c_B=commit(sk_B, r_B)$ using both a second secret value $sk_B$ and a second random number $r_B$.

In detail, at steps S310 and S320, each of the first key generation apparatus 100 and the second key generation apparatus 200 may generate the corresponding commit value using a keyed hash function as a commit algorithm.

The secret values and the random numbers may be open for subsequent verification.

Next, in the key generation method based on machine learning according to the embodiment of the present invention, the first key generation apparatus 100 and the second key generation apparatus 200 may train a neural network so that respective weight values thereof match each other using a predefined neural-network learning algorithm at step S330.

Here, the first weight value of the first key generation apparatus 100 may be represented by "$weight_A$", and the second weight value of the second key generation apparatus 200 may be represented by "$weight_B$".

At step S330, the first key generation apparatus 100 and the second key generation apparatus 200 may match the first weight value with the second weight value using the predefined neural-network learning algorithm.

Here, any of various conventional neural network algorithms may be used as the neural-network learning algorithm.

Further, in the key generation method based on machine learning according to the embodiment of the present invention, the first key generation apparatus 100 and the second key generation apparatus 200 may share the first commit value and the second commit value with each other so as to perform mutual authentication, and may verify the commit values by comparing the first commit value and the second commit value with the first commit value and the second commit value uploaded to the public repository 10 at steps S340 and S350.

At steps S340 and S350, the first key generation apparatus 100 and the second key generation apparatus 200 may use a Message Authentication Code (MAC) to generate MAC values from a set of output values (parity bits) generated during training of the neural network, and the secret values used to generate the commit values.

In this case, at steps S340 and S350, the first key generation apparatus 100 may generate a first MAC value $m_A=mac(sk_A, p_A)$ using both a set $p_A$ of output values (first parity bits) generated during training of the neural network and the first secret value $sk_A$ used to generate the first commit value.

Further, at steps S340 and S350, the second key generation apparatus 200 may generate a second MAC value $m_B=mac(sk_B, p_B)$ using both a set $p_B$ of output values (second parity bits) generated during training of the neural network and the second secret value $sk_B$ used to generate the second commit value.

Here, at step S360, the first key generation apparatus 100 may transmit the first MAC value to the second key generation apparatus 200, and the second key generation apparatus 200 may transmit the second MAC value to the first key generation apparatus 100.

At step S360, the first key generation apparatus 100 may transmit the first commit value, the first secret value, and the first random number to the second key generation apparatus 200.

At step S360, the second key generation apparatus 200 may check whether the received first commit value matches the first commit value uploaded to the public repository 10, and may generate a first verification MAC value $m_{AB}=mac(sk_A, p_B)$ using the received first secret value $sk_A$.

At step S360, the second key generation apparatus 200 may compare the received first MAC value with the first verification MAC value, and may determine that verification has succeeded when the MAC values match each other.

Here, at step S370, the second key generation apparatus 200 may transmit the second commit value, the second secret value, and the second random number to the first key generation apparatus 100.

At step S370, the first key generation apparatus 100 may check whether the received second commit value matches the second commit value uploaded to the public repository 10, and may generate a second verification MAC value $m_{BA}=mac(sk_B, p_A)$ using the received second secret value $sk_B$.

Here, at step S370, the first key generation apparatus 100 may compare the received second MAC value with the second verification MAC value, and may determine that verification has succeeded when the MAC values match each other.

Furthermore, in the key generation method based on machine learning according to the embodiment of the present invention, the first key generation apparatus 100 and the second key generation apparatus 200 may generate a first hash value and a second hash value, respectively, using the matched weight value, and may generate a session secret key based on the result of mutually verifying whether the first hash value is identical to the second hash value at steps S380 and S390.

In this case, at step S380, the first key generation apparatus 100 may generate a first seed value $seed_A$=OWF($weight_A$) from the first weight value $weight_A$ using a predefined one-way function.

Here, one of various conventional hash functions may be used as the one-way function.

Here, at step S380, the first key generation apparatus 100 may generate a first hash value $ck_A$=H($seed_A$||$info_A$) from the first seed value $seed_A$ using a predefined hash function, and may transmit the first hash value $ck_A$ to the second key generation apparatus 200.

Because the first key generation apparatus 100 and the second key generation apparatus 200 match their weight values with each other during training of the neural network, $weight_A$=$weight_B$ may be satisfied.

Therefore, the second key generation apparatus 200 may generate a second seed value $seed_B$=OWF($weight_B$) from the second weight value $weight_B$ using the predefined one-way function.

At step S390, the second key generation apparatus 200 may generate a second hash value $ck_B$=H($seed_B$||$info_B$) from the first seed value $seed_B$ using a predefined hash function, and may verify whether the first hash value matches the second hash value.

Here, $info_A$ and $info_B$ may be key generation information previously shared between the first key generation apparatus 100 and the second key generation apparatus 200 so as to generate hash values.

Here, at step S390, when the first hash value matches the second hash value, the second key generation apparatus 200 may determine that verification of the hash values has succeeded, and may transmit the second hash value $ck_B$ to the first key generation apparatus 100.

At step S390, the first key generation apparatus 100 may verify whether the received second hash value matches the previously generated first hash value, and may determine that verification of the hash values has succeeded when the first hash value matches the second hash value.

Here, at step S390, when verification of the first hash value and the second hash value has been completed, each of the first key generation apparatus 100 and the second key generation apparatus 200 may generate a session secret key sk=KGF($seed_A$, $info_{session}$)=KGF($seed_B$, $info_{session}$) for secret communication using a predefined Key Generation Function (KGF).

Here, $info_{session}$ may correspond to $info_A$ and $info_B$.

Because the first seed value $seed_A$ and the second seed value $seed_B$ are generated based on the same weight value ($weight_A$=$weight_B$), the first key generation apparatus 100 and the second key generation apparatus 200 may share the identically authenticated secret session key sk with each other.

Figure 4:
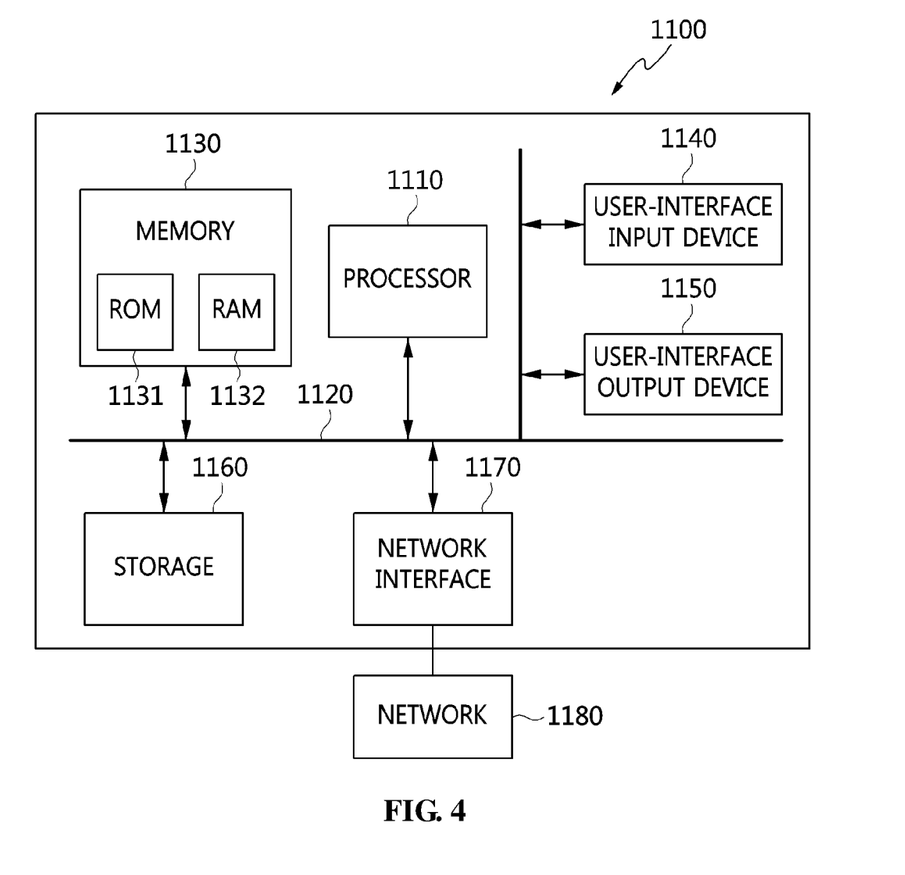
FIG. 4 is a diagram illustrating a computer system according to an embodiment of the present invention.

FIG. 4 is a diagram illustrating a computer system according to an embodiment of the present invention.

Referring to FIG. 4, a key generation apparatus based on machine learning according to an embodiment of the present invention may be implemented in a computer system 1100, such as a computer-readable storage medium. As illustrated in FIG. 4, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The key generation apparatus based on machine learning according to an embodiment of the present invention may include one or more processors 1110 and execution memory 1130 for storing at least one program executed by the one or more processors 1110, wherein the at least one program is configured to generate a commit value and upload the commit value to an external repository, train a neural network so as to match a weight value of the key generation apparatus with a weight value of an additional key generation apparatus with which user authentication is performed, using a predefined neural-network learning algorithm, share the commit value and a commit value of the additional key generation apparatus with the additional key generation apparatus, compare the shared commit values with respective commit values uploaded to the external repository, and then verify the commit values, and when verification of the commit values has succeeded, generating a hash value using the matched weight value, verify whether the generated hash value and a hash value generated by the additional key generation apparatus are identical to each other, and generate a session secret key based on the result of verification of the hash values.

Here, the at least one program may be configured to use a Message Authentication Code (MAC) to generate a MAC value from a parity bit which is output during training of the neural network and a secret value which is used for generation of the commit value.

Here, the at least one program may be configured to share the generated MAC value and a MAC value generated by the additional key generation apparatus with the additional key generation apparatus, compare the shared MAC value with a verification MAC value generated by the key generation apparatus, and then verify the MAC value.

Here, the at least one program may be configured to generate a seed value from the weight value using a predefined one-way function.

Here, the at least one program may be configured to generate the hash value from the seed value and previously shared key generation information using a predefined hash function.

Here, the at least one program may be configured to share the generated hash value and a hash value generated by the additional key generation apparatus with the additional key generation apparatus, compare the shared hash value with the hash value generated by the key generation apparatus, and verify whether the hash values match each other.

Here, the at least one program may be configured to, when the hash values match each other, determine that verification of the hash values has succeeded, and generate the session secret key from the hash values and the key generation information using a predefined key generation function.

The present invention may provide key exchange technology and user authentication for overcoming vulnerability to a man-in-the-middle attack at the time of key exchange between users and for implementing secure secret communication.

As described above, in the key generation apparatus and method based on machine learning according to the present invention, the configurations and schemes in the above-described embodiments are not limitedly applied, and some or all of the above embodiments can be selectively combined and configured so that various modifications are possible.

What is claimed is:

1. A key generation method based on machine learning, the key generation method being performed by key generation apparatuses based on machine learning, the key generation method comprising:
generating, by a first key generation apparatus, a first commit value, generating, by a second key generation apparatus, a second commit value, and uploading the first commit value and the second commit value to an external repository;
training, by the first key generation apparatus and the second key generation apparatus, a neural network so as to match weight values thereof with each other using a predefined neural-network learning algorithm;
sharing, by the first key generation apparatus and the second key generation apparatus, the first commit value and the second commit value with each other, comparing the shared first and second commit values with the first and second commit values uploaded to the external repository, and then verifying the shared first and second commit values; and
when verification of the shared first and second commit values has succeeded, generating, by the first key generation apparatus and the second key generation apparatus, respective hash values using the matched weight value, verifying whether the generated hash values are identical to each other, and generating a session secret key based on a result of verification of the hash values.

2. The key generation method of claim 1, wherein verifying the shared first and second commit values is configured such that the first key generation apparatus and the second key generation apparatus use a Message Authentication Code (MAC) to generate respective MAC values from parity bits which are output during training of the neural network, and secret values which are used for generation of the shared first and second commit values.

3. The key generation method of claim 2, wherein verifying the shared first and second commit values is configured such that the first key generation apparatus and the second key generation apparatus share the generated MAC values with each other, compare the shared MAC values with verification MAC values generated thereby, and then verify the MAC values.

4. The key generation method of claim 3, wherein generating the session secret key is configured to generate seed values from the weight values using a predefined one-way function.

5. The key generation method of claim 4, wherein generating the session secret key is configured to generate the hash values from the seed values and previously shared key generation information using a predefined hash function.

6. The key generation method of claim 5, wherein generating the session secret key is configured such that the first key generation apparatus and the second key generation apparatus share the generated hash values with each other, compare the shared hash values with the hash values generated thereby, and then verify whether the shared hash values match the generated hash values.

7. The key generation method of claim 6, wherein generating the session secret key is configured to, when the hash values match each other, determine that verification of the hash values has succeeded, and generate the session secret key from the hash values and the key generation information using a predefined key generation function.

8. A key generation apparatus based on machine learning, comprising:
one or more processors; and
an execution memory for storing at least one program that is executed by the one or more processors,
wherein the at least one program is configured to:
generate a commit value and upload the commit value to an external repository,
train a neural network so as to match a weight value of the key generation apparatus with a weight value of an additional key generation apparatus with which user authentication is performed, using a predefined neural-network learning algorithm,
share the commit value and a commit value of the additional key generation apparatus with the additional key generation apparatus, compare the shared commit values with respective commit values uploaded to the external repository, and then verify the shared commit values, and
when verification of the shared commit values has succeeded, generating a hash value using the matched weight value, verify whether the generated hash value and a hash value generated by the additional key generation apparatus are identical to each other, and generate a session secret key based on a result of verification of the hash values.

9. The key generation apparatus of claim 8, wherein the at least one program is configured to use a Message Authentication Code (MAC) to generate a MAC value from a parity bit which is output during training of the neural network and a secret value which is used for generation of the commit value.

10. The key generation apparatus of claim 9, wherein the at least one program is configured to share the generated MAC value and a MAC value generated by the additional key generation apparatus with the additional key generation apparatus, compare the shared MAC value with a verification MAC value generated by the key generation apparatus, and then verify the MAC value.

11. The key generation apparatus of claim 10, wherein the at least one program is configured to generate a seed value from the weight value using a predefined one-way function.

12. The key generation apparatus of claim 11, wherein the at least one program is configured to generate the hash value from the seed value and previously shared key generation information using a predefined hash function.

13. The key generation apparatus of claim 12, wherein the at least one program is configured to share the generated hash value and a hash value generated by the additional key generation apparatus with the additional key generation apparatus, compare the shared hash value with the hash value generated by the key generation apparatus, and verify whether the hash values match each other.

14. The key generation apparatus of claim 13, wherein the at least one program is configured to, when the hash values match each other, determine that verification of the hash values has succeeded, and generate the session secret key from the hash values and the key generation information using a predefined key generation function.

* * * * *